United States Patent
Shimabukuro et al.

[11] Patent Number: 5,991,000
[45] Date of Patent: Nov. 23, 1999

[54] CAVITY UNIFORMITY HAVING PATTERNED SPACES OF ALUMINUM OXIDE OR SILICON DIOXIDE

[75] Inventors: Randy L. Shimabukuro; Howard Walker; Stephen D. Russell, all of San Diego, Calif.

[73] Assignee: United States of America as represented by the Secretary of the Navy, Washington, D.C.

[21] Appl. No.: 08/668,646

[22] Filed: Jun. 13, 1996

[51] Int. Cl.[6] ................................... G02F 1/1339
[52] U.S. Cl. .......................... 349/155; 349/153; 349/157
[58] Field of Search ..................... 399/153, 155, 399/156, 157

[56] References Cited

U.S. PATENT DOCUMENTS

| | | | |
|---|---|---|---|
| 4,130,408 | 12/1978 | Crossland et al. | 349/153 |
| 4,256,382 | 3/1981 | Piliavin et al. | 349/155 |
| 4,422,731 | 12/1983 | Droguet et al. | 349/155 |
| 4,626,073 | 12/1986 | Amstutz et al. | 349/155 |
| 4,626,303 | 12/1986 | Ogura | 349/153 |
| 4,775,225 | 10/1988 | Tsuboyama et al. | 349/155 |
| 4,983,429 | 1/1991 | Takayanagi et al. | 349/155 |
| 5,054,890 | 10/1991 | Hanyu et al. | 349/155 |
| 5,089,905 | 2/1992 | Sasaki et al. | 349/155 |
| 5,329,110 | 7/1994 | Shimabukuro et al. | 250/207 |
| 5,387,445 | 2/1995 | Horiuchi et al. | 349/153 |
| 5,486,941 | 1/1996 | Saiuchi et al. | 349/155 |
| 5,499,127 | 3/1996 | Tsubota et al. | 349/155 |
| 5,537,235 | 7/1996 | Ishihara et al. | 349/155 |
| 5,580,619 | 12/1996 | Sakai et al. | 349/155 |
| 5,621,553 | 4/1997 | Nishiguchi et al. | 349/156 |
| 5,636,043 | 6/1997 | Uemura et al. | 349/156 |
| 5,668,617 | 9/1997 | Na | 349/156 |
| 5,680,189 | 10/1997 | Shimizu et al. | 349/155 |
| 5,784,137 | 7/1998 | Shimomi et al. | 349/156 |

*Primary Examiner*—William L. Sikes
*Assistant Examiner*—Toan Ton
*Attorney, Agent, or Firm*—Harvey Fendelman; Michael A. Kagan; Eric James Whitesell

[57] ABSTRACT

A method for forming a uniform cavity between electrode substrates of a display comprises the steps of patterning a border to define a display area between the electrode substrates, patterning electrode spacers between the electrode substrates, and wafer bonding the electrode substrates to the border and to the electrode spacers to form a uniform cavity within the display area. A cavity comprises a pair of substrates enclosing the cavity and patterned spacers wafer bonded to the substrates to form and maintain a uniform thickness of the cavity.

8 Claims, 3 Drawing Sheets

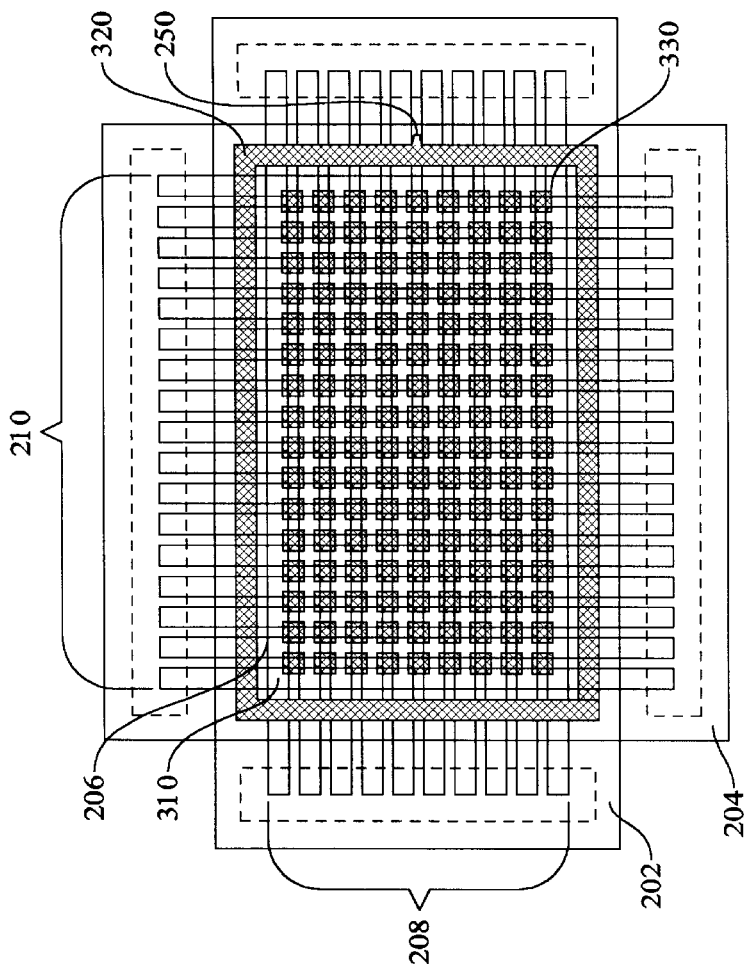
FIG. 3A
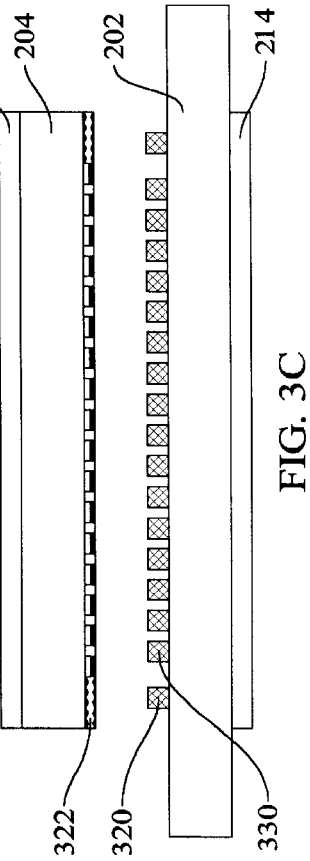
FIG. 3C
FIG. 3B

CAVITY UNIFORMITY HAVING PATTERNED SPACES OF ALUMINUM OXIDE OR SILICON DIOXIDE

BACKGROUND OF THE INVENTION

The present invention relates to methods for forming and maintaining precise cavity dimensions. More specifically, but without limitation thereto, the present invention relates to a method for forming a uniform cavity between the electrode substrates of a nematic liquid crystal display (LCD) and a device made by this method.

A simplified structure of a liquid crystal display is illustrated in FIG. 1. To provide accurate control of the electrical field and optical path length between transparent electrode substrates 102, it is desirable to maintain a uniform spacing "d" in the cavity between electrode substrates 102 filled with a liquid crystal material 106. Current methods for establishing spacing "d" depend on the flatness of electrode substrates 102.

In the top and side views of a typical liquid display 20 illustrated respectively in FIGS. 2(a) and 2(b), spacer materials 220 made of, for example, chopped glass fibers and micro-plastic balls are typically scattered over the surface of a lower electrode substrate 202. A display area 206 is bordered by an adhesive 200 printed on upper electrode substrate 204 or lower electrode substrate 202. A filling gap 250 may be left for introducing a liquid crystal material (not shown). A pattern of vertical data electrodes 210 on upper electrode substrate 204 opposes a pattern of horizontal scanning electrodes 208 on lower electrode substrate 202 to define pixels within display area 206.

A disadvantage of using scattered glass fibers or micro-plastic balls to define the spacing between data electrodes 210 and scanning electrodes 208 is that the difficulty of maintaining a high degree of flatness increases with the area of the display. This disadvantage is further compounded by the thermal stress of the methods used to bond electrode substrates 202 and 204 with adhesives having different temperature coefficients.

Another disadvantage of this arrangement is that irregularities in the flatness of one or both substrates causes the cavity formed between electrode substrates 202 and 204 to vary in thickness at the electrode gaps. In non-linear active matrix displays, such as ferroelectric LCD's, surface plasmon displays and the like, there is often a critical electric field required to switch the array elements Since the operating voltage is determined by the product of the electric field and the distance between electrodes, a variation in the electrode gaps raises the voltage required to control the array of pixel elements. Other flat panel display technologies including field emission, miniaturized CRT, plasma, micro-electro-mechanical and the like may also benefit from a method for forming a uniform cavity.

SUMMARY OF THE INVENTION

The method for forming a uniform cavity and a liquid crystal display made by this method described herein are directed to overcoming the problems described above, and may provide further related advantages. No embodiment in the following description should be construed to preclude other embodiments and advantages of the present invention that may exist or become obvious to those skilled in the art.

The method for forming a uniform cavity between electrode substrates of a liquid crystal display of the present invention comprises the steps of patterning a border to define a display area between the electrode substrates, patterning electrode spacers between the electrode substrates, and wafer bonding the electrode substrates with the border and the electrode spacers to form a uniform cavity within the display area.

The liquid crystal display of the present invention comprises a pair of electrode substrates, a patterned border defining a display area between the electrode substrates, and electrode spacers patterned on the electrode substrates to define a uniform cavity within the display area.

An advantage of the method for forming a uniform cavity in a liquid crystal display is that the flatness criteria for the electrode substrate materials may be relaxed, allowing larger arrays to be fabricated with relatively inexpensive substrate materials and processes.

Another advantage is that lower voltages may be used to maintain the critical electric field for larger displays.

Yet another advantage is that critical spacing dimensions may be formed and maintained across large areas.

The features and advantages summarized above in addition to other aspects of the present invention will become more apparent from the description accompanied by the following drawings.

BRIEF DESCRIPTION OF THE DRAWINGS

FIG. 3 illustrates top, front, and side views of a liquid crystal display with electrode spacers made according to the present invention.

DESCRIPTION OF THE INVENTION

Figure 1:
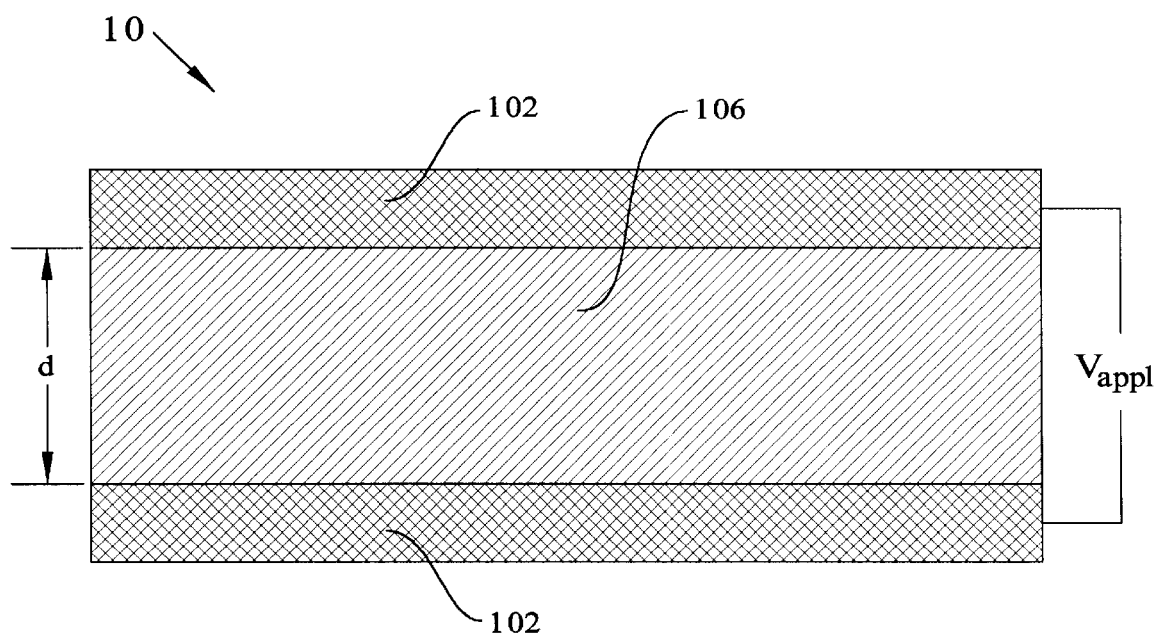
FIG. 1 is a simplified diagram illustrating the electrode spacing in a typical liquid crystal display.
Figure 2A:
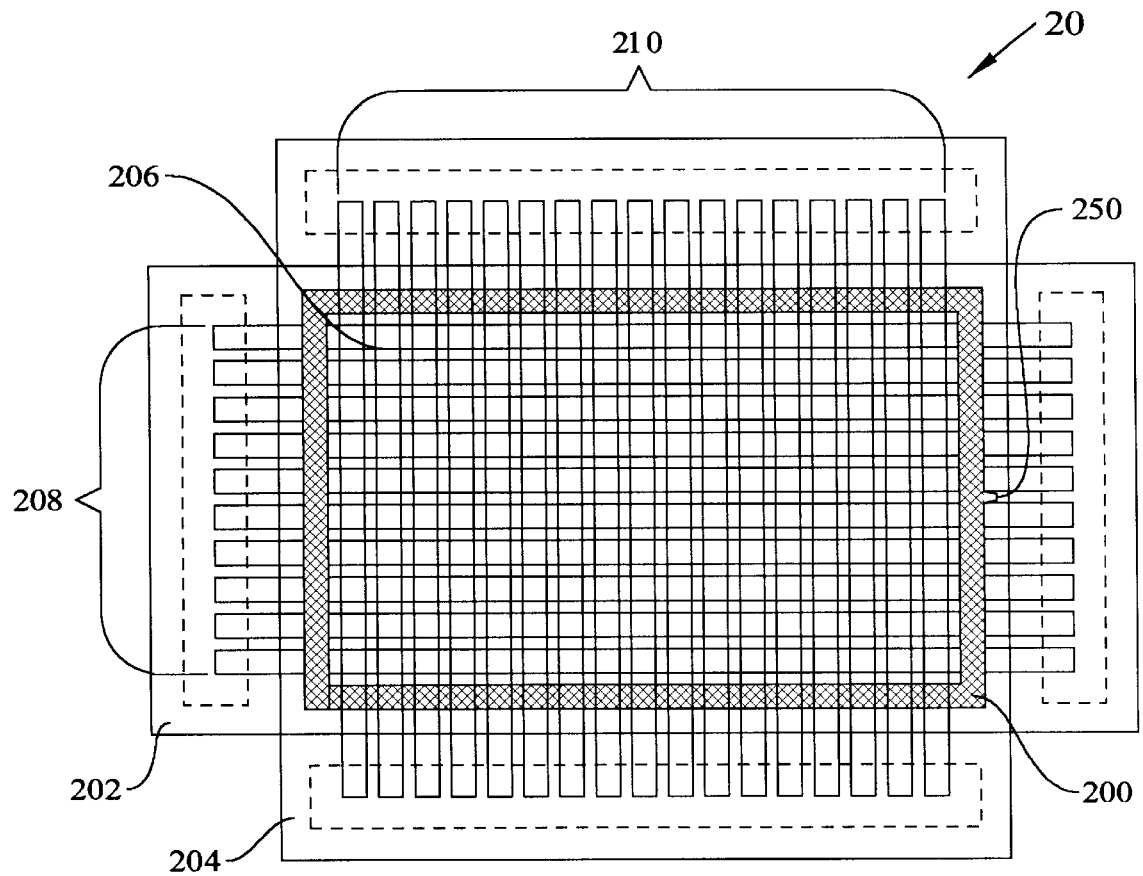
FIG. 2 illustrates top and front views of a liquid crystal display with electrode spacers of the prior art.
Figure 2B:
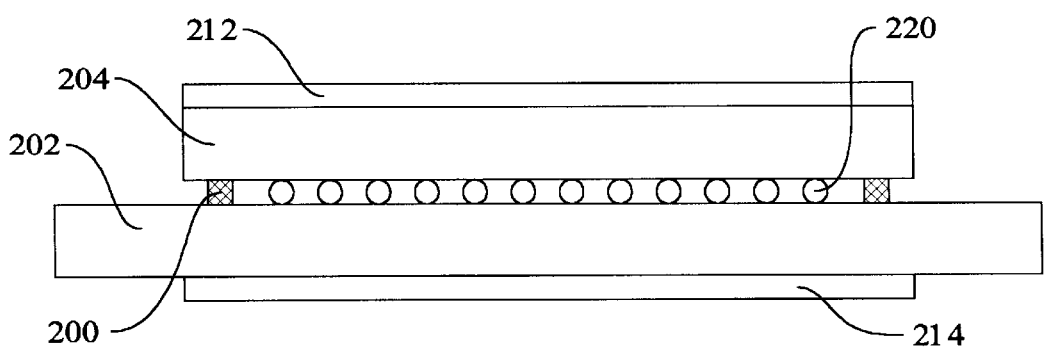

The following description is presented solely for the purpose of disclosing how the present invention may be made and used. The scope of the invention is defined by the claims.

FIG. 3 illustrates top, side, and front views of a liquid crystal display 30 with improved cavity uniformity. A suitable bonding material such as silicon dioxide or aluminum oxide is patterned to define a display area 206 on a scanning electrode substrate 202 and on a data electrode substrate 204 according to techniques well known in the art. A filling gap 250 may be left for introducing a liquid crystal material (not shown). A pattern of vertical data electrodes 210 is formed on data electrode substrate 204 opposite a pattern of horizontal scanning electrodes 208 formed on scanning electrode substrate 202 according to well known techniques to define pixels 310 at the electrode crossings within display area 206. A pattern of spacers 330 from a suitable material such as silicon dioxide is formed on scanning electrode substrate 202 in gaps 310 between the electrode crossings according to patterning techniques well known in the art. The patterned spacers 330 separating data electrode substrate 204 from scanning electrode substrate 202 define a cavity having a width equal to the thickness of patterned spacers 330. In the example shown of a liquid crystal display, the cavity is used to define display area 206. Spacers 330 may be formed, for example, by low pressure chemical vapor deposition (CVD), plasma enhanced CVD, high temperature oxide deposition or growth and the like, followed by lithographic patterning. The excess material may be removed by wet chemical, ion milling or dry (plasma, reactive ion) etching and the like. Alternatively, spacers 330 may be formed by patterning a previously deposited substrate layer. Display border 320 may be patterned in a similar manner as spacers 330 to enclose display area 206 as shown in FIGS. 3A, 3B and 3C for containing the liquid crystal material (not shown).

Data electrode substrate 204, scanning electrode substrate 202, and spacers 330 are then joined by wafer bonding, such as described in U.S. Pat. No. 4,897,362 issued on Jan. 30, 1990 to Delgado, et al and incorporated herein by reference thereto. Alternatively, other wafer bonding techniques may be used in fabricating liquid crystal displays according to the method of the present invention. Also, this method may be used to make uniform micro-cavities in other types of semiconductor and crystalline structures, for example, nematic liquid crystal displays, ferroelectric displays, field emission displays, plasma displays, surface plasmon displays, miniaturized CRT displays, and micro-electro-mechanical displays.

Other modifications, variations, and applications of the present invention may be made in accordance with the above teachings other than as specifically described to practice the invention within the scope of the following claims.

We claim:

1. A method for forming a substantially uniform cavity between a pair of substrates comprising the steps of:

patterning a border on at least one of the substrates to define an area within the cavity;

patterning spacers on at least one of the substrates within the area defined by the border to maintain a substantially constant separation between the substrates;

positioning the substrates for wafer bonding the substrates to the border and to the spacers; and wafer bonding the substrates to the border and to the spacers, wherein the border comprises at least one of aluminum oxide and silicon dioxide, and wherein the spacers comprise silicon dioxide.

2. The method of claim 1 further comprising the step of forming a filling port between the substrates.

3. A method for forming a cavity having a substantially uniform thickness between multiple substrates comprising the steps of:

patterning spacers on at least one of the substrates;

positioning the substrates for wafer bonding to the spacers; and wafer bonding the substrates to the spacers, wherein the spacers comprise at least one of aluminum oxide and silicon dioxide.

4. The method of claim 3 further comprising the step of forming a filling port between the layers.

5. A cavity having a substantially uniform thickness comprising:

at least two substrates enclosing said cavity, and a plurality of patterned spacers distributed within an area defined by a patterned border to maintain said substantially uniform thickness of said cavity, wherein said spacers comprise at least one of aluminum oxide and silicon dioxide.

6. The cavity of claim 5 further comprising a filling port formed between said substrates.

7. The cavity of claim 5 wherein said cavity defines a display area within a display.

8. The cavity of claim 5 wherein said display is one of a nematic liquid crystal display, a ferroelectric display, a field emission display, a plasma display, a surface plasmon display, a miniaturized CRT display, and a micro-electro-mechanical display.

* * * * *